Figure 1:
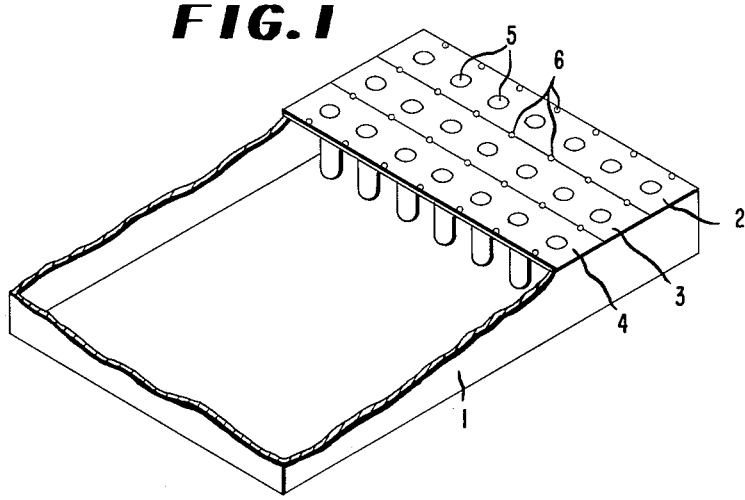

INVENTOR
WILLIAM J. TOUHEY JR.

BY *Robert C. Kline*

ATTORNEY

United States Patent Office 3,012,284
Patented Dec. 12, 1961

3,012,284
PROCESS FOR PREPARING CORED CELLULAR ARTICLES
William J. Touhey, Jr., Wilmington, Del., assignor to E. I. du Pont de Nemours and Company, Wilmington, Del., a corporation of Delaware
Filed Nov. 1, 1957, Ser. No. 693,959
5 Claims. (Cl. 18—48)

This invention relates to methods for molding cellular polyurethane articles, and more particularly to cored cellular polyurethane articles, such as cored mattresses.

Cored cellular polyurethane articles, such as foam mattresses, represent an attractive market objective for waterfoamable polyurethane compositions. Foam mattresses have, in general, been prepared by pouring a foamed rubber latex into a box-like mold until it is filled and then setting in place over the foam a cover plate from whose underside project a plurality of coring elements which extend down into the foam. Gelation of the foam subsequently occurs and the desired cellular rubber article is obtained. The use of latex foam rubber has gained wide consumer acceptance in this field even though a mattress prepared from latex foam rubber is inferior to a polyurethane foam mattress in load-bearing capacity and in resistance to both heat and abrasion. The reason that polyurethane foams have not been generally used heretofore is the fact that none of the prior art processes for the formation of cored articles, such as mattresses, are useful when preparing a cored cellular polyurethane product. Cellular polyurethane articles cannot be cored as readily as a latex foam rubber article because motion of the coring elements through incompletely gelled polyurethane foam tends to cause localized foam collapse and mediocre cell structure. Thus it is not possible to prepare an acceptable cored cellular polyurethane article by the prior art process of filling a mold with foam and placing a corecontaining cover plate or lid in place over the mold. Such a long time is required to fill the mold with the foamable polyurethane composition that by the time the mold is filled the portion added first will begin to foam before the core-containing cover plate or lid is in place, with the result that some of the coring pins will have to be forced down into the foaming mass. As mentioned above, this causes localized foam collapse and mediocre cell structure. In view of the advantages of a polyurethane foam over a latex foam rubber, it would be highly desirable to provide an acceptable cored cellular polyurethane article.

It is an object of this invention to provide a process for molding cored cellular polyurethane articles. A further object is to provide a process for molding these articles wherein the coring elements are in place prior to the time that they are contacted by the foamable polyurethane composition. Other objects will appear hereinafter.

These and other objects of the following invention are accomplished by the process of molding a cored cellular polyurethane article wherein a foamable polyurethane composition is introduced into a mold in a uniform manner and coring elements are then successively positioned in the mold before the composition has expanded enough to contact said positioned coring elements. The composition is then allowed to expand around these positioned coring elements with the result that no shearing action of the cellular article takes place. After the cellular article has formed and it has become tack-free, the coring elements are removed and a highly useful cored cellular polyurethane article is obtained. As a result of the process of the present invention wherein the coring elements are in place prior to the time that they are contacted by the foaming polyurethane composition with the result that the composition foams around these elements, no localized foam collapse occurs and a cellular material is obtained with excellent cell structure. The present process is devoid of any of the objectionable features inherent in the application of the prior art molding procedures to foamable polyurethane compositions.

It should be noted that in the prior art methods of latex foam rubber technology there is a suggestion that a mold cavity be used containing coring elements projecting up from its base. In this prior art process the foamed rubber latex is poured into the mold cavity (containing the coring elements) until it is filled, a flat cover plate or lid is set in place, and the foam is allowed to gel. In this prior art process the coring elements are positioned prior to the time that they are contacted by the foamed rubber latex. Such a mold arrangement, however, is not suitable for use in preparing highly satisfactory cored cellular polyurethane articles. When it is used, the fluid polyisocyanate composition is poured onto the mold base containing the coring elements; a flat cover plate or lid is then set in place on top of the mold. The fluid polyisocyanate composition subsequently expands to fill the mold with a polyurethane foam. It is quite apparent that when this procedure is used, the foam will rise around and above the static coring elements and that the uncored portions of the article at the top will be the last portions to be formed. In general, when working with polyurethane foams, the first portion of the polyurethane foam which is formed is superior in quality to the last portion which is formed. Thus, when following this prior art procedure with a polyurethane wherein the coring elements are in the base of the mold, the uncored portion of the molded article will be inferior in quality to the cored portion in that it will probably be marked by surface irregularities. Since the uncored portion is usually the upper side of these molded articles, it is quite obvious that the presence of surface irregularities is highly undesirable. Thus, this prior art technique is not particularly suitable for polyurethane foams.

When carrying out the process of the present invention, a foamable polyurethane composition is introduced into areas of a mold and coring elements are then successively placed in position in the mold above the surface of the foamable composition. Relative to the mold, each coring element is in place before it is contacted by the foaming composition. The foam expands around the static coring elements and thus no shearing action of any sort takes place. After the foaming step has been completed and the cellular product has become tack free, the coring elements are then removed. This process is free of the undesirable features of the prior art processes since it is not necessary to pour the entire mold with the foamable composition before the cover plate or lid containing the coring elements is placed in position.

Figure 2:
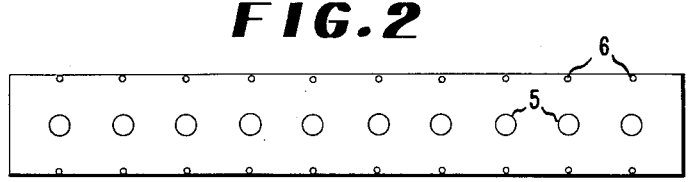
Figure 3:
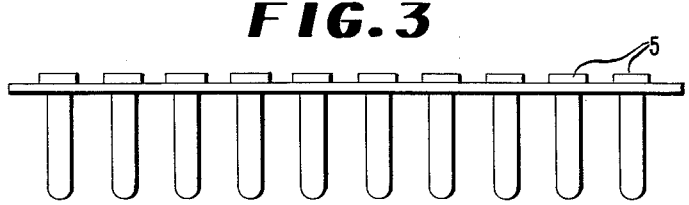
Figure 4:
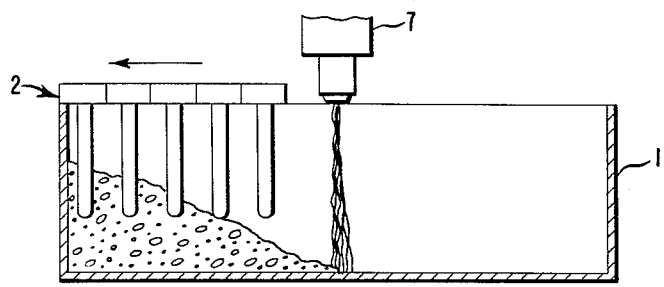

The accompanying drawings more particularly point out the features of the present invention. FIGURE 1 is a view of a mold 1 having several sections of coring elements in place. FIGURES 2 and 3 represent a top view and side view, respectively, of a typical section which contains coring elements. In FIGURE 1 sections 2, 3 and 4 containing coring elements 5 and vent holes 6 for the escape of air displaced from the mold, are pictured as being in place on a cavity or mold 1 having a base and four vertical sides. These sections 2, 3 and 4 containing the coring elements are put in place after a portion of the mold which corresponds to such a section has been poured with the foamable polyurethane composition. Thus, with reference to FIGURE 1, a foamable composition is poured to form a strip at one end of the mold 1. The first lid section is positioned above this strip and is immobilized by clamps or weights. The mold 1 is then moved or alternatively the mixing head is moved and a new strip of foamable composition is deposited. The next lid section is positioned alongside of the first positioned lid section and the process of successively pouring sections of foamable composition and positioning lid sections is continued until the entire mold has been poured and all lid sections are in place. FIGURE 4 depicts a longitudinal cross section of a mold after it has been partially filled with the foamable polyurethane composition. The mold 1 passes from right to left under a stationary mixing head 7 which mixing head deposits a foamable polyurethane composition in the base of the mold. After a strip of foam composition is deposited in the base of the mold, a lid section 2 containing coring elements which extend downwardly into the mold is positioned on top of the mold above this strip. This lid section is in place before the foamable composition has sufficiently expanded to come in contact with the coring elements. Additional strips of foamable composition are then deposited and the positioning of lid sections is continued. The pouring of the polyurethane composition is evenly controlled so that the sections of foam unite to provide a homogeneous product. It is quite obvious that in order to obtain a homogeneous product, the speed with which the mold is passed under the mixing head, the speed with which the mixing head fills the mold, the speed with which the lid sections are positioned, and the viscosity of the foamable polyurethane composition are all interrelated.

After the pouring of the mold cavity is finished and the lid sections are all positioned in place, the mold is allowed to stand until the composition has foamed and the resultant cellular product has become tack free. This may be accomplished at room temperature or, if desired, the time may be shortened by placing the mold in a heated chamber. The sections containing the coring elements are then removed by lifting each section in a direction substantially perpendicular to the mold in order to eliminate any possibility of tearing the cellular material. Then the cored cellular polyurethane article is stripped from the mold and passed through rollers so as to compress it to about 75 to 90% of its original thickness. This compression operation prevents shrinkage of the foam by breaking the residual closed cells. The cellular material is then heat-cured or is allowed to cure at room temperature.

The dimensions of the mold cavity which is used in the process of the present invention are not critical. Thus, the length of the cavity may be as great as desired with the only limitation being that of convenience in handling. The width of the cavity also may be as great as desired with the limitation that it be possible to pour the strip of foamable polyurethane composition fast enough to permit the lid section containing the coring elements to be positioned in place before the expanding foam comes in contact therewith. Likewise, the depth of the mold is not critical, it being understood that with larger depths, the output of the mixing head must be greater. It is recommended that the depth of the mold not exceed about 30 inches. For purposes of preparing a mattress, a mold having the dimensions of about 8 in. x 40 in. x 65 in. may be used with a mixing head which is delivering about 23 to 25 pounds of foamable polyurethane mixture per minute.

The mold cavity itself may be made from any suitable material, such as aluminum, steel, reinforced plastic, or any other material which is dimensionally stable during the operation of the process. It is usually desirable to treat the inner surface of the mold with a mold release agent, such as a high-melting wax, in order to facilitate removal of the foam therefrom. The lid sections containing the coring elements may be made of any material which remains rigid at the processing temperature, such as aluminum or plywood, and the coring elements themselves may be made of material such as polyethylene or may be tapered metal pins. Here again it is desirable that the coring elements and the lid section which come in contact with the foam be coated with a foam release agent.

The mixing heads which are used to deposit the foamable polyurethane composition in the mold in the process of the present invention may be any of the conventional mixing heads. A representative example of a mixing head consists of a 1¼ inch inside diameter pipe in which is located an agitator made up of a continuously bent wire, being bent in the form of S-shapes in one plane and fitted with suitable inlet nozzles at the top. The components of the foamable composition are fed to this mixing chamber, are mixed and then deposited in the mold cavity.

The water-foamable compositions which are preferred for use in the molding process of the present invention are the isocyanate-terminated polyurethanes which are prepared by agitating a molar excess of an arylene diisocyanate with a polyalkyleneether glycol, a polyalkyleneether-thioether glycol, a hydroxyl-terminated polyaliphatic hydrocarbon, a polyester containing a plurality of hydroxyl groups, or a tetrol made by reacting ethylenediamine sequentially with about 44 molar equivalents of 1,2-propylene oxide and about 11 molar equivalents of ethylene oxide. For purposes of this invention, it is preferred to use a foamable composition which will yield a resilient cellular article. It is to be understood that mixtures of the foregoing polyols may be employed, if desired.

The process of this invention may also be carried out by using a mixture of an isocyanate-terminated polyurethane and a polyol of the type listed above. At the time the mold is poured, these components are fed by separate streams to the mixing chamber where they are homogeneously dispersed. The relative amounts used are chosen so that enough free isocyanate groups are supplied to react with all the hydroxyl groups and to provide the carbon dioxide needed for expanding the foam. As above, it is preferred to use components which will yield a resilient cellular article.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 1000–4000. Representative examples of these glycols are poly-1,2-propyleneether glycol (molecular weight 1000), ethylene oxide-modified polypropyleneether glycol (molecular weight 3000), polytetramethyleneether glycol (molecular weight 3000), polypentamethyleneether glycol (molecular weight 4000), and polytetramethylene formal glycol (molecular weight 2000). These polyalkyleneether glycols are made by the polymerization of cyclic ethers such as alkylene oxides or dioxolane or by condensation of the glycols.

Representative polyalkyleneether-thioether glycols are the following:

$HO(CH_2CH_2—S—CH_2—CH_2—O—CH_2—CH_2—O—)_pH$ $HO(CH_2CH_2—S—CH_2CH_2—O—)_pH$,

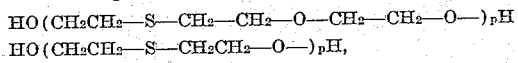

and $HO(CH_2CH_2—S—CH_2CH_2CH_2CH_2—S—CH_2CH_2—O—)_pH$ where $p$ is an integer indicating a molecular weight of 1000–4000. Their preparation is described in French Patent No. 1,128,561.

Typical polyaliphatic hydrocarbon diols are hydroxyl-terminated polybutadiene (molecular weight 3000) and hydroxyl-terminated polyisoprene (molecular weight 2000). Procedures for making this type of diol are disclosed in French Patent No. 1,139,630.

The polyesters containing a plurality of hydroxyl groups which are useful in the present invention should have an acid number less than 2, a hydroxyl number between about 30 and 60, and a water content no greater than 0.05% (by weight). They are made by the usual methods of condensation polymerization from a diol and a dibasic acid (e.g., 1,4-butanediol and adipic acid). Optionally, a small amount of a triol (e.g., trimethylolpropane) may be included to provide cross-linking; one molar equivalent for each 3000–12,000 molecular weight of polyester is recommended. Representative examples of useful diols are ethyleneglycol, 1,2-propyleneglycol, 1,3-propanediol, 1,2-butyleneglycol, 1,4-butanediol, thiodiglycol, diethyleneglycol, triethyleneglycol, and 1,2-alkylene oxide-modified glycols such as

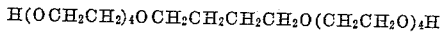

and

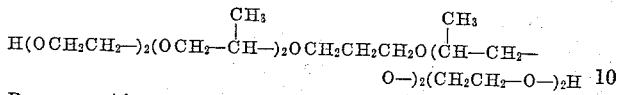

Representative examples of useful polyhydric compounds are glycerol, trimethylolpropane, trimethylolethane, and 1,2-alkylene oxide-modified glycerol, e.g.

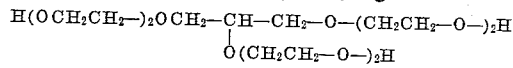

Representative examples of useful dicarboxylic acids are oxalic acid, malonic acid, succinic acid, glutaric acid, adipic acid, pimelic acid, suberic acid, azelaic acid, sebacic acid, fumaric acid, maleic acid, and phthalic acid. Anhydrides of dicarboxylic acids may be employed in place of the acids; succinic anhydride and phthalic anhydride are representative examples.

A wide variety of arylene diisocyanates may be employed in the process, either alone or as isomer mixtures or as mixtures of diisocyanates. Representative compounds include toluene-2,4-diisocyanate, 4-methoxy-1,3-phenylenediisocyanate, 4-chloro-1,3-phenylenediisocyanate, 4-isopropyl-1,3-phenylenediisocyanate, 4-ethoxy-1,3-phenylenediisocyanate, 2,4'-diisocyanatodiphenylether, 3,3-dimethyl-4,4'-diisocyanatodiphenylmethane, and 1,5-naphthalenediisocyanate. The preferred diisocyanate is toluene-2,4-diisocyanate. The preferred isomer mixture contains 80% toluene-2,4-diisocyanate and 20% toluene-2,6-diisocyanate. Triisocyanates such as toluene-2,4,6-triisocyanate and 2,4,4'-triisocyanatodiphenylether may be used to provide additional crosslinking.

In general, the isocyanate-terminated polyurethanes are made by agitating the organic polyols and arylene diisocyanates in such proportions that the overall ratio of the number of free isocyanate groups to the number of hydroxyl groups is greater than 1.0. If desired, the reaction may be carried out in several steps, one or more of which may produce hydroxyl-terminated polyurethanes prior to the final step. The one-step process requires about 1 to 2 hours at 90° C. or about 1.5 to 4 hours at 80° C. or about 4 to 8 hours at 70° C. Optionally, temperatures up to about 150° C. may be employed to introduce additional crosslinking by reactions such as allophanate formation. The progress of the reaction may be followed by determining the free isocyanate content of the mixture. Finally, the polyurethanes obtained are standardized to the desired free isocyanate content (usually 8 to 15% by weight) by addition of more diisocyanate.

When carrying out the process of this invention in the preferred manner, the isocyanate-terminated polyurethane composition is fed to the mixing head along with any other desired inert ingredients, such as surfactants, plasticizers, coloring agents, fillers, etc. The water, which is necessary for the foaming reaction, along with a catalyst to accelerate the formation of the cellular article, is fed simultaneously by a separate stream into the mixing head. If an isocyanate-terminated polyurethane composition and a polyol are used, they are fed simultaneously by separate streams into the mixing head; the water and catalyst are usually contained in the polyol stream; the inert ingredients mentioned above may be present in either stream or both; optionally, the water and catalyst may be introduced by one or more streams which enter the mixing head at the same time as the isocyanate-terminated polyurethane stream and the polyol stream. The temperatures at which the streams containing the reactants are fed to the mixing head are not critical; however, in general, temperatures of from about 25 to 50° C. should be used.

The ingredients of these streams are then mixed in the mixing head and the composition then deposited from the mixing head into the mold cavity. In general, when depositing the composition into the mold cavity, it is desirable to operate at about room temperature in order to minimize the possibility of too much foaming taking place before the lid sections are positioned on top of the mold. After the lid section has been positioned in place, the actual foaming of the composition takes place by the reaction of the water with the free isocyanate groups in the composition. The presence of a catalyst tends to accelerate this reaction. Theoretically, 0.5 mol of water is needed for each mol of free isocyanate groups present in the foamable composition. Generally, about 0.5 to 1.5 mols may be supplied, although about 0.6 to 1.0 mol is preferable. It is to be understood that "free" isocyanate groups means those isocyanate groups which are available to react with water. For example, when a polyol is present during the foaming reaction, its hydroxyl groups will react with isocyanate groups to form urethanes; the number of mols of alcoholic hydroxyl groups present in the foamable composition is subtracted from the total number of mols of isocyanate groups also present to get the number of mols of "free" isocyanate groups.

Any of the basic catalysts familiar to those skilled in the art of polyurethane foam technology may be used in the subject process provided that the concentration of the catalyst and its catalytic activity are so balanced that sufficient time is provided for positioning the coring elements without contacting the foaming polyurethane composition. N-methylmorpholine is a preferred catalyst which may be used alone or mixed with volatile trialkylamines such as triethylamine. Odorless catalysts such as 3-diethylaminopropionamide and heat-activated catalysts such as triethylamine citrate, 3-N-methylmorpholinopropionamide and 2-diethylaminoacetamide are employed advantageously. The mold must be heated to about 70° C. after loading, if the heat-activated compounds are used, to complete the foaming in a convenient period of time.

If desired, the process of the present invention may be carried out in a continuous manner wherein a mold cavity having a series of interlocking sections fastened to an endless conveyor belt is used. Each section has two vertical sides and thus this continuous embodiment provides, in effect, a two-sided mold capable of producing a continuous molded article of any desired length. This mold cavity on the endless conveyor belt is passed under a mixing head and the foamable composition is deposited in the mold. The cavity section containing this foamable composition is then moved to a point at which a cored section is dropped into place above the foamable composition. Suitable means may be used to keep this cored section in place as the composition is foaming, such as an endless conveyor belt which rides on top of these core sections as the mold section is being passed through a heated chamber, such as an oven, wherein the foamable composition expands to fill the mold and becomes tack free. After the mold leaves the oven, the core section may then be lifted perpendicularly from the mold section and the foam then stripped from the mold and drawn through rollers. The foam is obtained as a continuous slab containing successive rows of cores.

The following examples will better illustrate the nature of the present invention; however, the invention is not intended to be limited to these examples. Parts are by weight unless otherwise indicated.

EXAMPLE 1

A. *Preparation of polyurethane polymer*

65 parts of a hydroxyl-terminated polyalkyleneether glycol which is polypropyleneether glycol of molecular weight about 1650 modified by reaction with about 4 molar equivalents of ethylene oxide, 25 parts of a tetrol which is made by sequentially reacting ethylenediamine with about 44 molar equivalents of 1,2-propylene oxide and about 11 molar equivalents of ethylene oxide, 10 parts of polytetramethyleneether glycol of 3000 number-average molecular weight, 0.02 part of polydimethylsiloxane (50 centistokes grade), and 0.3 part of water are agitated for 30 minutes at room temperature. To the mixture thus obtained is added 15 parts of a toluene diisocyanate isomer mixture (80% 2,4- and 20% 2,6-). Heat is evolved and the temperature rises. When the temperature begins to fall, external heat is applied and the temperature of the mass is adjusted to 80° C. The mass is agitated at 80° C. for 1.5 hours. Then 25 additional parts of the toluenediisocyanate isomer mixture is introduced. The mixture is cooled to room temperature as quickly as possible by application of external cooling. The polyurethane polymer obtained has a free isocyanate content of 9.5% and exhibits a Brookfield viscosity at 25° C. of about 8000–9000 cps.

B. Preparation of masterbatch 100 parts of the polyurethane polymer prepared in A above is mixed at room temperature with 0.5 part of polydimethylsiloxane (50 centistokes grade) and 10 parts of didecylphthalate.

C. Preparation of catalyst solution 15 parts of N-methylmorpholine is mixed at room temperature with 20 parts of water.

D. Preparation of a cored mattress

An 8 x 40 x 65-inch steel pan at 40° C. is used as the cavity of the mold. The lid consists of thirteen ½ x 5 x 42-inch plywood sections on each of which are mounted 10 coring pins made of closed polyethylene tubing 6 inches long and 1¼ inches in diameter. The inside of the mold and the surface of the lid sections from which the core pins project are coated with a high melting wax.

Masterbatch 1B above at about 45° C. and catalyst solution 1C above at room temperature are separately pumped to a bent wire mixer at rates of about 24.5 pounds per minute and 0.78 pound per minute, respectively. The catalyst stream supplies 1.5 parts of N-methylmorpholine and 2 parts of water for every 100 parts by weight of polyurethane polymer 1A. The streams are mixed by an agitator operated at 3000 revolutions per minute and are discharged through a ½-inch nozzle opening directly into the mold.

The mixing head moves back and forth across the cavity to introduce the foamable composition in 13 successive strips parallel to the width of the pan. Each time a strip has been poured, the pan is advanced about 5 inches and a lid section is positioned and clamped above the strip. About 98 seconds is required to fill the mold.

The mold assembly is allowed to stand for 20 minutes. During this time the foaming mass within the mold fills it to form a resilient polyurethane foam mattress which has a density of about 2.9 pounds per cubic foot. At the end of 20 minutes the core pins are pulled from the foam by lifting the lid sections vertically. The foam is stripped from the mold and run once between rollers which compress it about 75%. It is then cured at 90° C. for 16 hours.

EXAMPLE 2

A. Preparation of polyurethane polymer 75 parts of a hydroxyl-terminated polyalkylene-ether glycol which is polypropyleneether glycol of molecular weight about 1650 modified by reaction with about 4 molar equivalents of ethylene oxide, 25 parts of a tetrol which is made by sequentially reacting ethylenediamine with about 44 molar equivalents of 1,2-propylene oxide and about 11 molar equivalents of ethylene oxide, 0.02 part of polydimethylsiloxane (50 centistokes grade), and 0.3 part of water are stirred together for 20 minutes at room temperature. Then 15 parts of a 80:20 mixture of tolene-2,4- and toluene-2,6-diisocyanate is introduced. Heat is evolved. After the temperature of the mass begins to drop, external heat is applied. The reactants are agitated for 2 hours at a temperature of 80° C. Then 25 additional parts of the toluenediisocyanate mixture is introduced with stirring. External cooling is applied and the temperature of the mass is quickly lowered to about 30° C. The fluid polyurethane polymer thus obtained has a free isocyanate content of about 9.3%.

B. Preparation of masterbatch 100 parts of the polyurethane polymer prepared in A above is mixed at room temperature with 0.5 part of polydimethylsiloxane (5 centistokes grade) and 5 parts of didecylphthalate.

C. Preparation of catalyst solution 10 parts of N-methylmorpholine, 3 parts of triethylamine and 24 parts of water are mixed together at room temperature.

D. Preparation of a cored mattress

The same equipment described in 1D is used here. Masterbatch 2B and catalyst solution 2C are separately pumped at room temperature to a bent wire mixer at rates of about 24.5 pounds per minute and 0.86 pound per minute, respectively. The catalyst stream supplies 1 part of N-methylmorpholine, 0.3 part of triethylamine, and 2.4 parts of water for every 100 parts by weight of the polyurethane polymer 1B. The mold is poured by the same procedure described in Example 1 except that each pass of the mixing head across the mold requires only 7 seconds; hence, the mold is poured in about 91 seconds. The mold assembly is then allowed to stand for 20 minutes at room temperature. The resilient cellular product formed within the mold is removed and processed by the procedure described in Example 1. The mattress obtained has a density of about 2.6 pounds per cubic foot.

EXAMPLE 3

A. Preparation of polyurethane polymer 3000 parts of polytetramethyleneether glycol of number-average molecular weight 3000 (water content less than 0.05% by weight) and 348 parts of an 80:20 mixture of toluene-2,4- and toluene-2,6-diisocyanate are agitated at 60° C. for 2 hours in a dry reaction vessel protected from atmospheric moisture. An additional 35 parts of the toluenediisocyanate isomer mixture is introduced and the mass is agitated at 140° C. for 2 hours. It is then cooled to room temperature and standardized to 13% free isocyanate content by the addition of 482 parts of the toluenediisocyanate isomer mixture.

B. Preparation of masterbatch 100 parts of the polyurethane polymer prepared in 3A above is mixed at room temperature with 0.5 part of polydimethylsiloxane (50 centistokes grade) and 10 parts of didecylphthalate.

C. Preparation of catalyst solution 15 parts of N-methylmorpholine and 33 parts of water are mixed together at room temperature.

D. Preparation of a cored mattress

The same equipment described in part D of Example 1 is used here. Masterbatch 3B at 45° C. and catalyst solution 3C at room temperature are separately pumped to a bent wire mixer at rates of about 24.5 pounds per minute and 1.06 pounds per minute, respectively. The catalyst stream supplies 1.5 parts of N-metylmorpholine and 3.3 parts of water for every 100 parts by weight of the polyurethane polymer 3A. The mold is poured by the same procedure described in Example 1 except that each pass of the mixing head across the mold requires only 6 seconds; hence, the mold is poured in about 78 seconds. The mold assembly is then allowed to stand for 20 minutes. The product mattress is stripped from the mold and processed by the procedure described in Example 1. The resilient cellular material has a density of about 2.5 pounds per cubic foot.

As many different embodiments of this invention may be made without departing from the spirit and scope thereof, it is to be understood that this invention is not limited to the specific embodiments thereof except as defined in the appended claims.

What is claimed is:

1. The process of preparing a cored cellular polyurethane article in a mold having an open cavity and a multi-sectional cover plate, which process comprises continuously and progressively introducing a foamable polyurethane composition along said open cavity, successively and progressively positioning said cover plate sections above said foamable polyurethane composition so that the coring elements, which are dependently attached to said cover plate sections, are in place extending perpendicularly downward into said open mold cavity before said polyurethane composition has expanded enough to come in contact with said coring elements, allowing said foamable polyurethane composition to expand to fill the space as defined by said open mold cavity and said multi-sectional cover plate, removing the coring elements in a direction substantially perpendicular to the cellular polyurethane article when said article has become tack-free and removing said article from the mold.

2. In a process of preparing a cored cellular polyurethane article from a foamable polyurethane composition, the improvement comprising introducing said foamable composition into an open mold cavity in a uniform continuous and progressive manner and successively and progressively positioning cover plate sections of a multi-sectional cover plate, having coring elements dependently attached thereto, above said foamable composition, said coring elements extending perpendicularly downward into said open mold cavity above said polyurethane composition before said polyurethane composition has expanded enough to come in contact therewith.

3. A process according to claim 1 wherein the foamable polyurethane composition comprises an isocyanate-terminated polyurethane, a tertiary amine catalyst and water.

4. A process according to claim 3 wherein the isocyanate-terminated polyurethane is obtained by reacting a molar excess of an arylene diisocyanate with a polyalkyleneether glycol.

5. A process according to claim 4 wherein the polyalkyleneether glycol is a polypropyleneether glycol and the arylene diisocyanate is an 80:20 isomer mixture of toluene-2,4- and toluene-2,6-diisocyanate.

References Cited in the file of this patent

UNITED STATES PATENTS

| | | |
|---|---|---|
| 2,199,006 | Minor | Apr. 30, 1940 |
| 2,700,178 | Blake | Jan. 25, 1955 |
| 2,757,415 | Mathues et al. | Aug. 7, 1956 |
| 2,804,650 | Kunce | Sept. 3, 1957 |
| 2,804,653 | Talalay | Sept. 3, 1957 |
| 2,827,665 | Rogers et al. | Mar. 25, 1958 |